US009384611B2

(12) United States Patent
Dyk et al.

(10) Patent No.: US 9,384,611 B2
(45) Date of Patent: Jul. 5, 2016

(54) METHOD AND SYSTEM FOR SELF-DISCOVERY AND MANAGEMENT OF WIRELESS SECURITY DEVICES (71) Applicant: Tyco Integrated Security, LLC, Boca Raton, FL (US)

(72) Inventors: Peter Dyk, Pickering (CA); Allan McLellan, Oakville (CA); Ken Brubaker, Toronto (CA); Tuckweng Tham, Mississauga (CA); Kam-Yuen Ko, Thornhill (CA)

(73) Assignee: Tyco Integrated Security, LLC, Boca Raton, FL (US)

( * ) Notice: Subject to any disclaimer, the term of this patent is extended or adjusted under 35 U.S.C. 154(b) by 74 days.

(21) Appl. No.: 13/952,306

(22) Filed: Jul. 26, 2013

(65) Prior Publication Data

US 2015/0028993 A1    Jan. 29, 2015

(51) Int. Cl.
*G05B 19/00* (2006.01)
*G07C 9/00* (2006.01)
*H04L 12/28* (2006.01)
*H04W 12/08* (2009.01)

(52) U.S. Cl.
CPC ........ *G07C 9/00571* (2013.01); *H04L 12/2809* (2013.01); *H04W 12/08* (2013.01); *G07C 9/00309* (2013.01); *G07C 2009/00825* (2013.01); *H04L 2012/2841* (2013.01)

(58) Field of Classification Search
CPC .......... G07C 9/00571; G07C 9/00817; G07C 9/00309
USPC ......................................................... 340/5.5
See application file for complete search history.

(56) References Cited

U.S. PATENT DOCUMENTS

| 2002/0099945 | A1* | 7/2002 | McLintock et al. .......... 713/186 |
| 2005/0270151 | A1 | 12/2005 | Winick |
| 2006/0161270 | A1 | 7/2006 | Luskin et al. |
| 2008/0055073 | A1* | 3/2008 | Raneri et al. ............. 340/539.13 |
| 2008/0298274 | A1* | 12/2008 | Takashige et al. ............ 370/254 |
| 2010/0023865 | A1 | 1/2010 | Fulker et al. |
| 2010/0148919 | A1* | 6/2010 | Roberts et al. ................. 340/5.2 |
| 2010/0283579 | A1 | 11/2010 | Kraus et al. |
| 2010/0296402 | A1* | 11/2010 | Fraccalvieri et al. ......... 370/252 |

OTHER PUBLICATIONS

CEM Systems, "Aperio Wireless Locks" www.cemsys.com, 2 pgs., Feb. 13, 2013.

(Continued)

*Primary Examiner* — Jennifer Mehmood
*Assistant Examiner* — John Mortell
(74) *Attorney, Agent, or Firm* — HoustonHogle, LLP (57) ABSTRACT A system and method for automated discovery of wireless locks in a security system allows installers to assign each wireless lock to a slot on a wireless hub that provides wireless communications to the wireless locks. Device controllers poll the wireless hubs to discover the communications paths to each wireless lock. The device controllers store the information obtained from the polling, and present the information to a control system that manages the wireless locks. This eliminates the current practice of manually updating assignment information on the control system between wireless hub slots and the wireless locks in response to additions, deletions, or relocations of wireless locks within the security system. This is especially useful in installations that include hundreds or thousands of wireless locks within office buildings, hotels, or conference centers.

33 Claims, 5 Drawing Sheets (56) References Cited

OTHER PUBLICATIONS

Aperio Technology, "Installation Guide" pp. 1-29, Dec. 1, 2011.
International Search Report and Written Opinion of the International Searching Authority, mailed on Oct. 21, 2014, from counterpart International Application No. PCT/US2014/047530, filed on Jul. 22, 2014.
International Preliminary Report on Patentability, mailed Oct. 22, 2015, for companion case PCT/US2014/047530, International Filing Date Jul. 22, 2014.

* cited by examiner

METHOD AND SYSTEM FOR SELF-DISCOVERY AND MANAGEMENT OF WIRELESS SECURITY DEVICES

BACKGROUND OF THE INVENTION

Security systems are often deployed in schools, government buildings, corporate offices, and even many residences. These security systems are comprised of security devices such as sensors, door controllers, security cameras, access control readers, video servers, access control systems, intrusion panels, and elevator control systems, to list a few examples.

Generally, the security devices are used to monitor locations in and around buildings and enable authorized users to access restricted areas through locked doors, for example. Typically, the security devices are connected to a security network and are controlled by a control system (or monitoring station).

In an example, an access control reader reads an employee keycard while a security camera simultaneously monitors and records the employee's movements. If the employee is authorized to access restricted areas, the monitoring station instructs the door controller to unlock the door. Typically, security systems distribute the management and control of security information among multiple monitoring stations and access points within the security system. This distributed information allows the access control readers to make decisions from data downloaded from the access control system.

The installation of security devices in security systems is often complex and time consuming. First, an installer or designer has to identify and select locations throughout the building to install the security devices. Next, the installer has to physically mount the security devices in the building and supply power to the security devices. Next, the installer must connect all of the security devices to the security network. In many cases, connecting the security devices to the security network requires running data cables from data transmission devices to all of the security devices.

After the physical installation of the security devices is complete, the installer must then configure each security device for communication with the monitoring station and/or other security devices on the security network. Generally, configuration of the security devices is tedious, requiring the repeated entering of configuration information such as device names, Internet Protocol ("IP") addresses, media access control ("MAC") addresses or other device identifiers ("IDs"), device locations, and/or slot numbers for devices. In many cases, the installer has to travel between different locations throughout the office building to configure the security devices, the security network, and the monitoring station of the security network.

Considering specifically traditional door access security systems, the access card replaces physical keys. The access card includes the user's credentials. The user presents the access card to the access card reader to gain access to the door. The access card reader is wired to a control system, such as the access control system ("ACS") which validates the user's credentials, and grants the users access to the door based on defined security policies by signaling a lock device for the door.

An emerging trend is the adoption of wireless door access systems using wireless lock devices installed in doors that include integrated access card reader functionality. The wireless lock devices, also known as wireless locks, communicate with the access control system via a wireless communications hub, or wireless hub. Each wireless hub often supports multiple wireless lock devices. The wireless hub is installed in a location that facilitates the support of multiple wireless lock devices, such as on a wall above the entry doors in a multi-tenant office building, for example. The wireless hubs, in turn, are typically wired to the access control system. This eliminates what is typically the greatest cost and inconvenience of traditional access control systems, which is the need to run wires from the access control system to the access card reader and lock device at each door.

After the physical installation of the wireless locks, installers then create pairings between the wireless lock devices and the wireless hubs to which the wireless lock devices attach. The installer creates these pairings on the ACS for each of the wireless lock devices.

The pairings typically include an ID that identifies the wireless lock device, such as a MAC address, and an identifier that identifies the communications path provided by the wireless hub to the wireless lock devices.

The communications path identifier to each wireless security device provided by the wireless hub is also referred to as a vector. Each vector is typically the wireless hub ID, such as a MAC address or RS485 address, appended with a slot number of the wireless hub to which each of the wireless lock devices attach. Using the wireless lock ID and vector pairings, security personnel can configure and manage the wireless lock devices from an access control system.

SUMMARY OF THE INVENTION

Existing security systems that include wireless lock devices have limitations when wireless lock devices are added to or removed from the system, and when wireless lock devices are relocated from one door to another door. This is because the installer must manually update the wireless lock ID and vector pairings on the ACS associated with each added, deleted, or relocated wireless lock device.

The need for installers and administrators to manually update the pairings on the control system in response to lock changes especially becomes problematic for large installations of hundreds or thousands of wireless lock devices. Large wireless lock device footprints are common, for sites such as large office buildings, hotels, or conference centers with many doors.

The present invention overcomes these limitations using device controllers, such as door controllers, that control the wireless hubs. The device controllers are located between the ACS and the wireless hubs. The door controllers poll the wireless hubs to discover the wireless locks devices connected to each wireless hub, and continuously route information and controls between the ACS and the wireless locks.

Users of the security system utilize the ACS to manage the wireless lock devices. On the ACS, users specify the lock IDs for the wireless lock devices they wish to manage, and an associated virtual controller ID ("VCID") that identifies a communications channel. On the wireless hubs, the installer creates the pairings between lock IDs for the wireless lock devices and slots of the wireless hubs. The door controllers continuously poll the wireless hubs for all wireless lock pairings and information from the wireless locks, and store the pairings and the wireless lock information.

The door controllers update their stored representation of the wireless lock pairings in response to the data obtained from the polling requests. In response to requests for the wireless lock devices from the ACS, the door controllers present the stored wireless lock pairings to the ACS. In this way, the system automatically adjusts to the addition, deletion, or relocation of wireless lock devices without the need to manually update location information for the wireless locks on the ACS.

In general, according to one aspect, the invention features a security system that provides discovery of wireless security devices. This security system includes a control system for managing the wireless security devices, one or more wireless hubs that provide slots for enabling wireless connections to the wireless security devices, and device controllers that communicate with the control system over communications channels and poll the wireless security devices via the slots of the wireless hubs to discover changes to the wireless security devices.

In embodiments, the wireless security devices are wireless door locks, which include a user credential reader for reading a user's credentials from an access card. The wireless security devices include an ID for identifying the wireless security devices.

Preferably, the control system specifies the wireless security devices to manage on the communications channels. Typically, the changes to the wireless security devices include adding new wireless security devices to the wireless hubs, removing the wireless security devices from the wireless hubs, and changing the locations of the wireless security devices on the wireless hubs. In one example, the security system comprises channel controllers that provide the communications channels, and define a virtual controller ID ("VCID") for the communications channels.

The control system assigns IDs of the wireless security devices to virtual controller IDs ("VCID") of the communications channels for managing the wireless security devices. The association between VCIDs and the wireless security devices allows the device controllers to request the virtual controller IDs ("VCID") associated with the assigned IDs of the wireless security devices from the control system. The control system sends messages to the device controllers over the communications channels for communicating with the wireless security devices, where the messages include IDs of the wireless security devices.

Typically, IDs of the wireless security devices are assigned to the slots of the wireless hubs for enabling the wireless connections to the wireless security devices. In addition, the device controllers poll the wireless hubs to discover the slots assigned to the wireless security devices, and to discover the slots unassigned to the wireless security devices.

Preferably, the wireless hubs provide path information to the wireless security devices, the path information including an ID of the wireless hubs, and the slots of the wireless hubs. The device controllers poll path information of the wireless hubs to retrieve requests from the wireless security devices assigned to the slots of the wireless hubs.

In addition, the device controllers poll path information of the wireless hubs for the slots of the wireless hubs unassigned to the wireless security devices to determine new, relocated, or deleted wireless security devices. Typically, the device controllers further include a polling daemon for polling path information of the wireless hubs to the wireless security devices.

In response to receiving the messages from the control system over the communications channels for communicating with the wireless security devices, the messages including requested IDs of the wireless security devices, the device controllers search path information of the slots of the wireless hubs. The path information includes IDs of the wireless security devices assigned to the slots. Upon finding a match between the requested IDs and the IDs of the wireless security devices assigned to the slots, the device controllers return messages that include an acknowledgment of the match to the control system.

The device controllers create a virtual controller instance for each of the IDs of the wireless security devices assigned to the slots that match the requested IDs, the virtual controller instances responding to the control system on behalf of the wireless security devices. The device controllers store path information for the slots of the wireless hubs assigned to the wireless security devices, and for the slots of the wireless hubs unassigned to the wireless security devices. The device controllers also provide IDs of the wireless security devices for the assigned slots to the control system.

Preferably, the device controllers store path information for the slots of the wireless hubs assigned to the wireless security devices. In one implementation, the device controllers store the path information according to whether the wireless security devices are online or offline.

In general, according to another aspect, the invention features a method for discovering wireless security devices in a security system including a control system, one or more wireless hubs that include slots, and device controllers. This method comprises the control system managing the wireless security devices, and the slots of the wireless hubs enabling wireless connections to the wireless security devices. The method also comprises the device controllers communicating with the control system over communications channels and polling the wireless security devices via the slots of the wireless hubs to discover changes to the wireless security devices.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
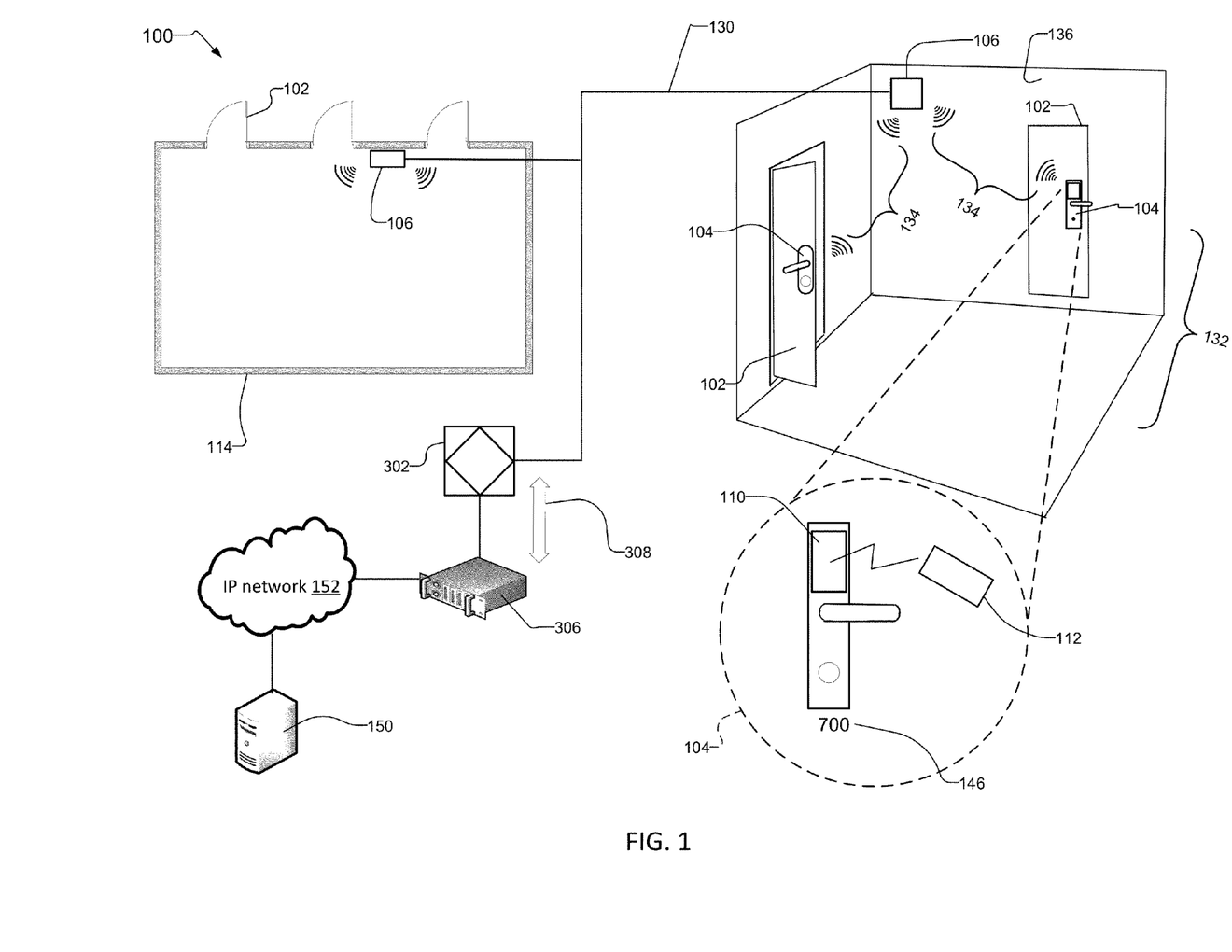
FIG. 1 is a schematic diagram of an example security system that includes wireless lock devices mounted on doors within rooms and floors of a building.

FIG. 1 shows an example security system 100 that includes wireless door locks 104 mounted on doors 102 within rooms 132 and floors 114 of a building. Wireless hubs 106 mounted to walls 136 provide wireless links 134 to the wireless door locks 104. The wireless hubs 106 communicate over a local network 130, such as RS485 or IEEE 802.3.

The wireless hubs 106 are controlled by device controllers such as door controllers 302. Channel controllers 306 provide communications channels 308 for the local network 130. The channel controllers 306 connect to a network 152, such as an internet protocol (IP) network. A control system 150, such as an access control system, manages the wireless door locks 104 and the other components of the security system 100. The control system 150 also connects to the IP network 152.

In examples, the wireless door locks 104 include credential readers 110 that read user credentials from access cards 112 presented to the credential readers 110 by users. Each wireless door lock 104 is identified by a unique ID, or wireless lockID 146, the arbitrary value of which is "700" in the figure. The values of the wireless lock IDs 146 and the IDs of the other devices that communicate over the local networks 130, such as the wireless hub IDs 208 for each wireless hub 106, are unique to enable proper communications between the devices.

The door controllers 302 poll the wireless hubs 106 to obtain information about wireless locks 104 assigned to the wireless hubs 106. The door controllers 302 provide the information obtained from the polling over the communications channels 308 to the control system 150.

Figure 2:
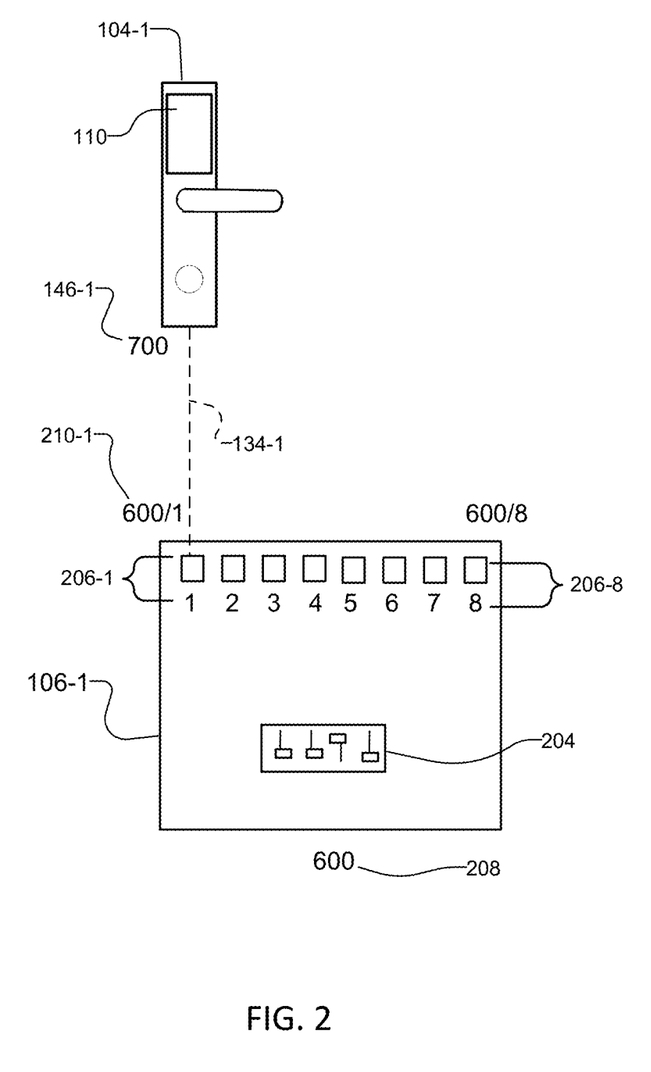
FIG. 2 is a schematic diagram showing a wireless lock assigned to a slot of a wireless hub providing a wireless connection to the wireless lock.

FIG. 2 shows an example wireless lock 104-1 connected to a slot 206 of wireless hub 106-1 via wireless connections 134-1. Wireless hub 106-1 includes eight slots 206, which provide support for connecting as many as eight wireless locks 104. Wireless hub 106-1 provides wireless connection 134-1 to wireless lock 104-1.

Wireless hub 106-1 is identified by wireless hub ID 208 value "600," which installers define using a Dual Inline Package ("DIP") switch 204 of the wireless hub 106-1, in one implementation.

Wireless hubs 106 provide communications paths, also known as vectors 210, to the wireless locks 104 assigned to the slots 206 of each wireless hub 106. In the example, wireless hub 106-1 provides wireless connection 134-1 via slot 206-1 to wireless lock 104-1. Each vector 210 includes the value of the wireless hub ID 208, appended by the value of the slot 206. In the example, wireless hub 106-1 provides vector 210-1 with value "600/1" associated with wireless lock 104-1. Wireless hub 106-1 also maintains vectors 210 for the slots 206 unassigned to wireless locks 104, such as vector 210-8 with value "600/8."

Wireless locks 104 are identified by wireless lock IDs 146. In the example, wireless lock 104-1 is identified by wireless lock ID146-1 value "700." The wireless locks 104 also include user credential readers 110.

Figure 3:
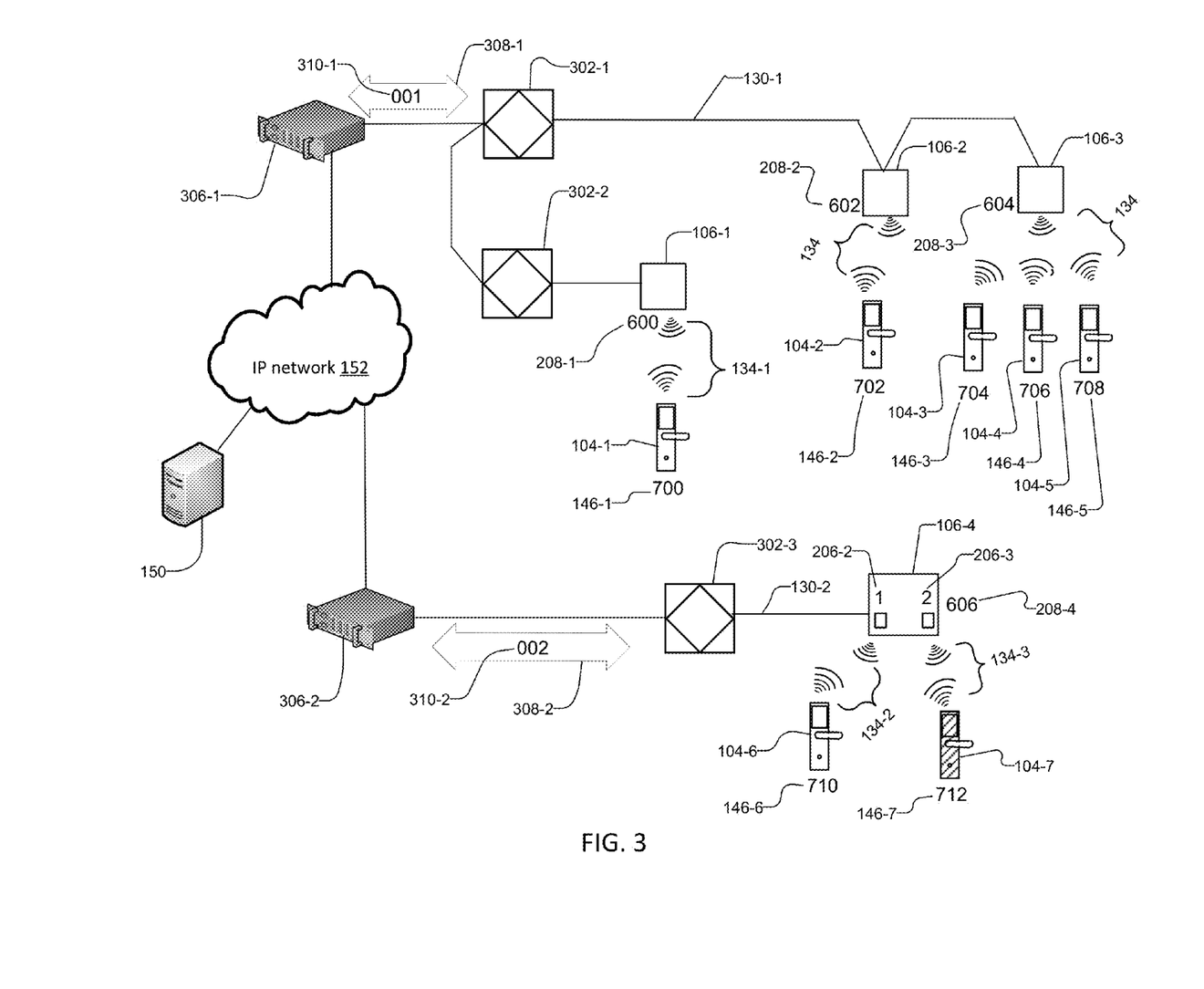
FIG. 3 is a schematic diagram for an exemplary configuration of wireless lock devices and the major components of the security system for managing and controlling the wireless lock devices.

FIG. 3 shows an example configuration of wireless locks 104 according to a preferred embodiment of the security system 100. The example includes wireless hubs 106 that provide wireless connections 134 to the wireless locks 104. The wireless hubs 106 communicate with door controllers 302 over RS-485 local networks 130. The door controllers 302 communicate information over communication channels 308 provided by channel controllers 306. The channel controllers 306 connect to IP network 152 for communicating with control system 150, and provide communications in messages over the communications channels from the wireless locks 104, the wireless hubs 106, and the door controllers 302 to the control system 150.

The example provides arbitrary but unique values for the wireless lock IDs 146 and the wireless hub IDs 208, required for all devices that communicate over local networks 130-1 and 130-2. In the example, network 130-1 is a serial communications network such as RS-485 or RS-422, and network 130-2 is a parallel communications network such as IEEE 802.3 network. All wireless locks 104 in the example communicate with their respective wireless hubs 106 over the wireless connections 134.

Wireless locks 104-1 through 104-6 are currently in an online state, while wireless lock 104-7 is currently in an offline state. This is indicated in the drawing using crosshatching across wireless lock 104-7. These conditions were chosen to illustrate behavior and detail for the door controllers 302, such as door controller 302-3, in response to different system conditions. More details for the door controllers 302, with an emphasis on door controller 302-3, accompanies the description associated with FIG. 4 that appears later in this section.

An installer installs wireless locks 104 in doors 102, and adds a necessary number of wireless hubs 106 to the local network 130 to ensure that the wireless locks 104 can communicate properly within the maximum wireless range provided by the wireless hubs 106. Then, the installer creates pairings that include the wireless lock IDs 146 of each wireless lock 104 and slots of the wireless hubs 106 to enable wireless communications between the wireless hubs 106 and the wireless locks 104.

During installation or relocation of the wireless locks 104, an installer pairs each wireless lock 104 with an unassigned slot 206 on a wireless hub 106, creating a separate wireless connection 134 between each wireless lock 104 and slot 206. In a preferred embodiment, an installer assigns no more than 32 wireless locks 104 per communication channel 308.

The installer connects one or more wireless hubs 106 to each door controller 302. To ensure proper wireless operations, the distance between the wireless locks 104 and the wireless hubs 106 is typically between 5 and 25 meters, depending on the specific capabilities of each wireless hub 106. Each door controller 302 can support up to 8 wireless hubs 106. Installers add door controllers 302 and wireless hubs 106 to the local networks 130 in response to distance considerations when installing the wireless locks 104, and in order to distribute the maximum number of 32 wireless locks 104 across per communication channel 308.

In response to the polling requests from the door controllers 302, the wireless hubs 106 provide the vectors 210 to the door controllers 302. The wireless hubs 106 also provide other information for the wireless locks 104, such as status information that indicates whether the wireless locks 104 are online or offline. The door controllers 302 store the vectors 210 for slots 206 assigned and unassigned to wireless locks 104, and other information from the wireless locks 104 to tables within the door controllers 302.

Channel controller 306-1 provides logical communication channel 308-1 to door controllers 302-1 and 302-2. Communication channel 308-1 is identified by virtual controller ID ("VCID") 310-1, value "001," in the example. Door controllers 302-1 and 302-2 communicate with wireless hubs 106-2 and 106-3 over local network 130-1, an RS-485 network.

Devices that communicate over local network 130-1 are identified by unique addresses for each device. The example shows unique RS-485 addresses for the values of the wireless lock IDs 146-1 through 146-5 for wireless locks 104-1 through 104-5, and unique RS-485 addresses for the values of wireless hub IDs 208-1 through 208-3 for wireless hubs 106-1 through 106-3.

Door controller 302-1 controls wireless hubs 106-2 and 106-3, identified by wireless hub IDs 208-2, "602," and 208-3, "604," respectively. Wireless hub 106-3 provides wireless connections 134 to wireless door locks 104-3, 104-4, and 104-5, identified by wireless lock IDs 146-3, value "704," 146-4, value "706," and 146-5, value "708," respectively. Wireless hub 106-2 provides wireless connections 134 to wireless door lock 104-2, identified by wireless lock IDs 146-2, value "702."

Channel controller 306-2 provides logical communication channel 308-2 to door controller 302-3. Communication channel 308-2 is identified by VCID 310-2, value "002," in the example. Door controller 302-3 communicates with wireless hub 106-4 over local network 130-2. Devices that communicate over local network 130-2 are identified by unique addresses for each device. The example shows unique MAC addresses for the values of the wireless lock IDs 146-6 and 146-7 for wireless locks 104-6 and 104-7, and unique MAC addresses for the value of wireless hub ID 208-4 for wireless hub 106-4, in another implementation.

Door controller 302-3 controls wireless hub 106-4, identified by wireless hub ID 208-4, "606." Wireless hub 106-4 provides wireless connection 134-2 via slot 1, identified by reference 206-2, to wireless lock 104-6. In addition, wireless hub 106-4 provides wireless connection 134-3 via slot 2, identified by reference 206-3, to wireless lock 104-7. Wireless locks 104-6 and 104-7 are identified by wireless lock IDs 146-6, value "710," and 146-7, value "712," respectively.

For managing the wireless locks 104, an operator on the control system 150 assigns the values of wireless lock IDs 146 for each wireless lock 104 to a VCID 310 that identifies a communications channel 308. The door controllers 302 listen for messages over the VCIDs 310, and continuously receive messages that include control information and data from the control system 150 for managing the wireless locks 104. The door controllers 302 continuously poll the wireless hubs 106 to obtain information about the wireless locks 104 assigned to the slots 206 of the wireless hubs 106, and provide the information to the control system 150 in response to requests from the control system 150.

Figure 4:
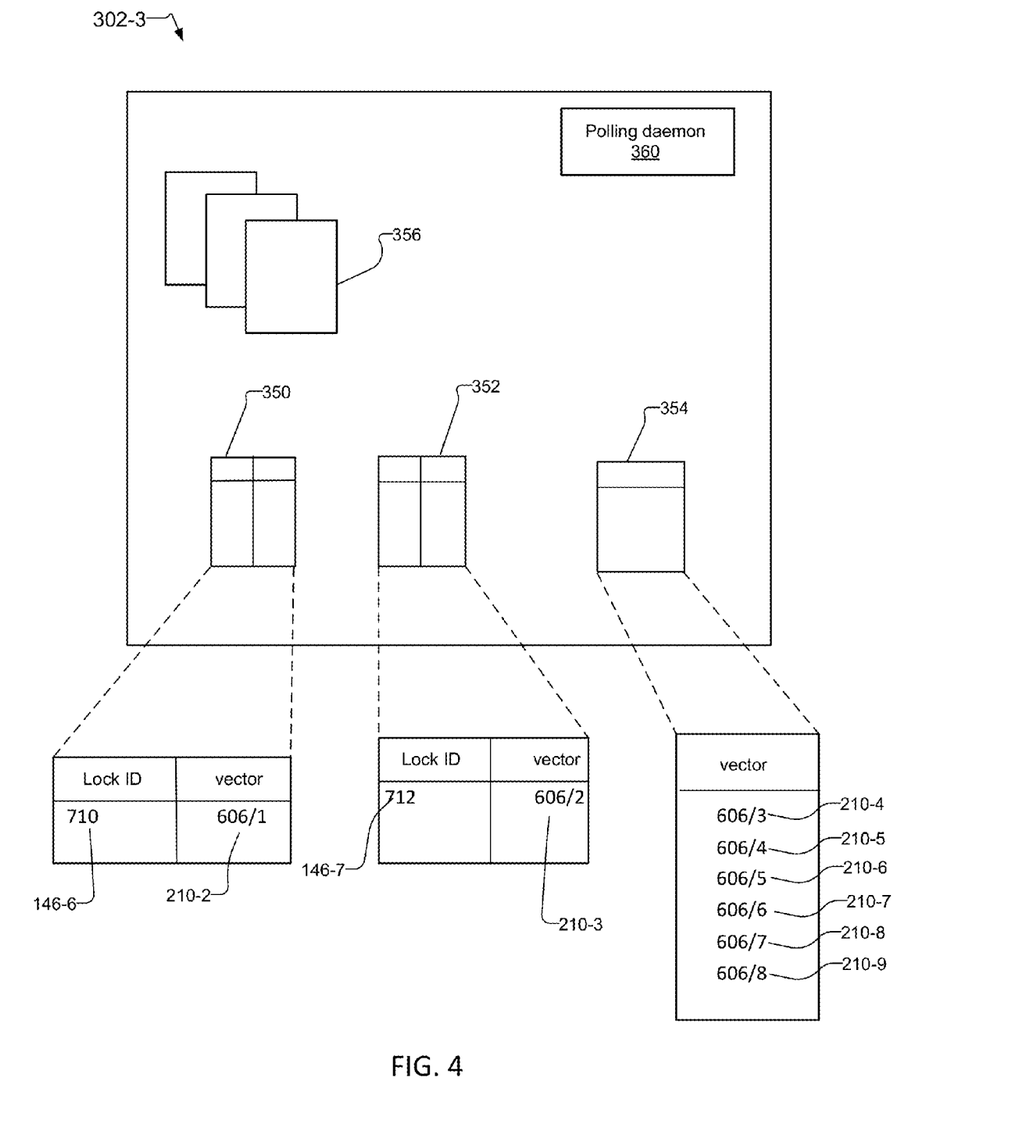
FIG. 4 is a schematic block diagram showing the components of a door controller of the present invention, including values for data tables that store path information for example lock devices shown in FIG. 3.

FIG. 4 shows more detail for the door controllers 302. Specifically, FIG. 4 shows detail for door controller 302-3 from FIG. 3. Door controller 302-3 includes a polling daemon 360 that polls wireless hub 106-4 to discover the wireless locks 104 assigned to wireless hub 106-4. Door controller 302-3 stores the information obtained from polling wireless hub 106-4, such as vectors 210 and wireless lock IDs 146, in different tables. In addition, the door controllers 302 create virtual door controller instances 356 that present information for the wireless locks 104 to the control system 150 from the stored information.

The tables include an online assigned slots table 350 ("online table,") an offline assigned slots table 352 ("offline table,") and an unassigned slots table 354 ("unassigned table"). In response to requests from the control system 150 for wireless lock IDs 146 on the communications channels 308, the door controllers 302 search the stored information in the tables for the requested wireless lock IDs 146.

Upon finding a match in either the online table 350 or the offline table 352, the door controllers 302 return an acknowledgment of the match to the control system 150, and create a virtual controller instance 356 associated with each matched lock ID 146. The virtual door controller instances 356 then communicate information on behalf of the matched wireless locks 104 to the control system 150.

Door controllers 302 are typically assigned to a communications channel 308 via the VCID 310 of the communications channel 308. During initialization, each door controller 302 listens for requests in messages from the control system 150 over the assigned VCID 310, and starts their polling daemon 360 to scan the slots 206 on the wireless hubs 106 controlled by each door controller 302. Each polling daemon 360 typically completes its polling within 3.5 minutes. The door controllers store the vectors 210 associated with the discovered pairings in either the online table 350 or the offline table 352, and unassigned vectors to the unassigned table 354.

Using the example lock configuration of FIG. 3, door controller 302-3 utilizes its polling daemon 360 to discover wireless locks 104-6 and 104-7, and unassigned slots 206 of wireless hub 106-4. From the data retrieved by the polling, door controller 302-3 first creates an entry in the online table 350, the entry including the value of wireless lock ID 146-6, "710," and the value of its associated vector 210-2, "606/1". Then, the door controller 302-3 creates an entry in the offline table 352, the entry including the value of wireless lock ID 146-7, "712," and the value of its associated vector 210-3, "606/2".

Finally, the door controller 302-3 creates entries in the unassigned table 354, the entries including the values of vectors 210-4 through 210-9 associated with unassigned slots 206. The entries of the online table 350 and offline table 352 are searchable by both wireless lock ID 146 and vector 210, and the entries of the unassigned table are searchable by vector 210.

Figure 5:
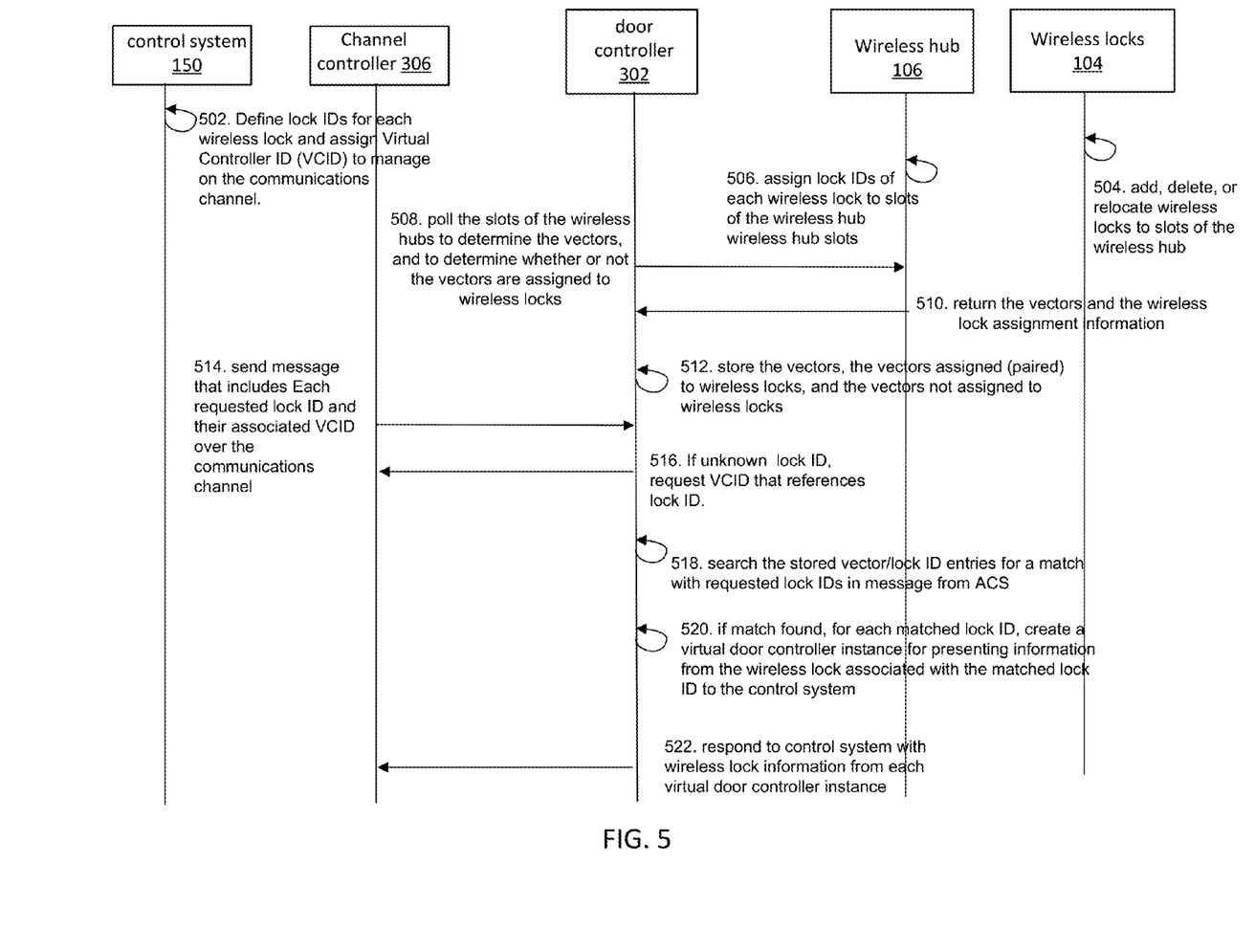
FIG. 5 is a sequence diagram that shows data flows between the major components of the security system for accomplishing dynamic discovery of wireless lock devices, using a simplified example that includes one door controller and one wireless hub communicating information for one or more wireless locks to the access control system over one communications channel.

FIG. 5 shows a sequence diagram with associated steps for discovering wireless lock devices. In step 502, an operator on control system 150 defines lock IDs 146 for each wireless lock 104 and assigns a Virtual Controller ID ("VCID") 310 to manage on a communications channel 310.

According to step 504, an installer adds, deletes, or relocates wireless locks 104 to slots 206 of the wireless hub 106. In step 506, the installer assigned lock ID 146 of each wireless lock 104 to slots 206 of the wireless hub 106. This process is also referred to as "pairing" each wireless lock 104 to a slot 206 of the wireless hub 106 for enabling wireless communications between the wireless locks 104 and the wireless hubs 106.

Then, in step 508, door controller 302 polls the slots 206 of the wireless hub 106 to determine the vectors 210, and to determine whether or not the vectors 210 are assigned to wireless locks 104. In step 510, in response to the polling, the wireless hub 106 returns the vectors 210 and the wireless lock assignment information to the door controller 302.

In step 512, the door controller 302 stores the vectors 210, the vectors 210 assigned (paired) to wireless locks 104, and the vectors 210 not assigned to wireless locks 104. In step 514, the channel controller 306 sends a message that includes each requested lock ID 146 and associated VCID 310 over the communications channel 308.

The door controller 302, in step 516, determines if each requested lock ID 146 is associated with the VCID 310 the door controller 302 is listening on. If a lock ID 146 is unknown, the door controller 302 requests the channel controller 306 for the VCID 310 that references the lock ID 146. Once the lock ID 146 is known, the door controller 302 searches its stored tables for vector 210 and lock ID 146 entries, for a match with the requested lock IDs in messages from the ACS or control system 150, in step 518.

In step 520, if a match is found, for each matched lock ID 146, the door controller 302 creates a virtual door controller instance 356 for presenting information from the wireless locks 104 associated with the matched lock IDs 146 to the control system 150. In step 522, the door controller 302 responds to the control system via the channel controller 306 with wireless lock 104 information from each virtual door controller instance 356.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security system providing discovery of wireless security devices of a building, comprising:
   a control system for managing the wireless security devices;
   one or more wireless hubs that provide slots for enabling wireless connections to the wireless security devices; and
   device controllers that communicate with the control system over communications channels and poll the wireless security devices via the slots of the wireless hubs to discover changes to the wireless security devices;
   wherein wireless security devices are wireless door locks.

2. The system of claim 1, wherein the wireless door locks include a user credential reader for reading a user's credentials from an access card.

3. The system of claim 1, wherein the wireless security devices include an ID for identifying the wireless security devices.

4. The system of claim 1, wherein the control system specifies the wireless security devices to manage on the communications channels.

5. The system of claim 1, wherein the changes to the wireless security devices include:
   adding new wireless security devices to the wireless hubs;
   removing the wireless security devices from the wireless hubs; and
   changing the locations of the wireless security devices on the wireless hubs.

6. The system of claim 1, further comprising channel controllers that provide the communications channels, and define a virtual controller ID ("VCID") for the communications channels.

7. The system of claim 1, wherein the control system assigns IDs of the wireless security devices to virtual controller IDs ("VCID") of the communications channels for managing the wireless security devices.

8. The system of claim 7, wherein the device controllers request the virtual controller IDs ("VCID") associated with the assigned IDs of the wireless security devices from the control system.

9. The system of claim 1, wherein:
   IDs of the wireless security devices are assigned to the slots of the wireless hubs for enabling the wireless connections to the wireless security devices; and
   the device controllers poll the wireless hubs to discover the slots assigned to the wireless security devices, and to discover the slots unassigned to the wireless security devices.

10. The system of claim 1, wherein the wireless hubs provide path information to the wireless security devices, the path information including an ID of the wireless hubs, and the slots of the wireless hubs.

11. The system of claim 1, wherein the device controllers poll path information of the wireless hubs to retrieve requests from the wireless security devices assigned to the slots of the wireless hubs.

12. The system of claim 1, wherein the device controllers poll path information of the wireless hubs for the slots of the wireless hubs unassigned to the wireless security devices, to determine new, relocated, or deleted wireless security devices.

13. The system of claim 1, wherein the device controllers further include a polling daemon for polling path information of the wireless hubs to the wireless security devices.

14. The system of claim 1, wherein in response to receiving the messages from the control system over the communications channels for communicating with the wireless security devices, the messages including requested IDs of the wireless security devices:
   the device controllers search path information of the slots of the wireless hubs that includes IDs of the wireless security devices assigned to the slots, and upon finding a match between the requested IDs and the IDs of the wireless security devices assigned to the slots, return messages that include an acknowledgment of the match to the control system.

15. The system of claim 14, wherein the device controllers create a virtual controller instance for each of the IDs of the wireless security devices assigned to the slots that match the requested IDs, the virtual controller instances responding to the control system on behalf of the wireless security devices.

16. The system of claim 1, wherein the device controllers:
   store path information for the slots of the wireless hubs assigned to the wireless security devices, and for the slots of the wireless hubs unassigned to the wireless security devices, and
   provide IDs of the wireless security devices for the assigned slots to the control system.

17. The system of claim 16, wherein the device controllers store the path information for the slots of the wireless hubs assigned to the wireless security devices according to whether the wireless security devices are online or offline.

18. The system of claim 1, further comprising a local network that enables communications between the device controllers and the wireless hubs.

19. A method for discovering wireless security devices, which are wireless door locks, in a security system including a control system, one or more wireless hubs that include slots, and device controllers for a building, the method comprising:
   the control system managing the wireless security devices;
   the slots of the wireless hubs enabling wireless connections to the wireless security devices; and
   the device controllers communicating with the control system over communications channels and polling the wireless security devices via the slots of the wireless hubs to discover changes to the wireless security devices.

20. The method of claim 19, further comprising the control system specifying the wireless security devices to manage on the communications channels.

21. The method of claim 19, further comprising the changes to the wireless security devices including:
   adding new wireless security devices to the wireless hubs;
   removing the wireless security devices from the wireless hubs; and changing the locations of the wireless security devices on the wireless hubs.

22. The method of claim 19, further comprising the control system assigning IDs of the wireless security devices to virtual controller IDs ("VCID") of the communications channels for managing the wireless security devices.

23. The method of claim 22, further comprising the device controllers requesting the virtual controller IDs ("VCID") associated with the assigned IDs of the wireless security devices from the control system.

24. The method of claim 19, further comprising the control system sending messages to the device controllers over the communications channels for communicating with the wireless security devices, the messages including IDs of the wireless security devices.

25. The method of claim 19, further comprising:
assigning IDs of the wireless security devices to the slots of the wireless hubs for enabling the wireless connections to the wireless security devices; and
the device controllers polling the wireless hubs to discover the slots assigned to the wireless security devices, and to discover the slots unassigned to the wireless security devices.

26. The method of claim 19, further comprising the wireless hubs providing path information to the wireless security devices, the path information including an ID of the wireless hubs, and the slots of the wireless hubs.

27. The method of claim 19, further comprising the device controllers polling path information of the wireless hubs to retrieve requests from the wireless security devices assigned to the slots of the wireless hubs.

28. The method of claim 19, further comprising the device controllers polling path information for the slots of the wireless hubs unassigned to the wireless security devices, to determine new, relocated, or deleted wireless security devices.

29. The method of claim 19, wherein in response to receiving the messages from the control system over the communications channels for communicating with the wireless security devices, the messages including requested IDs of the wireless security devices:
the device controllers searching path information of the slots of the wireless hubs that includes IDs of the wireless security devices assigned to the slots, and upon finding a match between the requested IDs and the IDs of the wireless security devices assigned to the slots, returning messages that include an acknowledgment of the match to the control system.

30. The method of claim 19, further comprising the device controllers creating a virtual controller instance for each of the IDs of the wireless security devices assigned to the slots that match the requested IDs, the virtual controller instances responding to the control system on behalf of the wireless security devices.

31. The method of claim 19, further comprising the device controllers:
storing path information for the slots of the wireless hubs assigned to the wireless security devices, and for the slots of the wireless hubs unassigned to the wireless security devices; and
providing IDs of the wireless security devices for the assigned slots to the control system.

32. The system of claim 1, wherein the device controllers poll the wireless hubs for all wireless lock pairings and information from the wireless door locks, and update stored representations of the wireless lock pairings in response to responses from the polling to adjust to the addition, deletion, or relocation of wireless door locks.

33. A security system providing discovery of wireless door locks, comprising:
a control system for managing the wireless door locks;
one or more wireless hubs that provide slots for enabling wireless connections to the wireless door locks;
device controllers that communicate with the control system over communications channels and poll the wireless door locks via the slots of the wireless hubs to discover changes to the wireless door locks, device controllers including a polling daemon for polling path information of the wireless hubs to retrieve requests from the wireless door locks assigned to the slots of the wireless hubs; and
channel controllers that provide the communications channels, and define a virtual controller ID for the communications channels.

* * * * *